(12) United States Patent
Williams et al.

(10) Patent No.: US 6,609,870 B2
(45) Date of Patent: Aug. 26, 2003

(54) GRANULAR SEMICONDUCTOR MATERIAL TRANSPORT SYSTEM AND PROCESS

(75) Inventors: Dick S. Williams, Houston, TX (US); Howard VanBooven, O'Fallon, MO (US); Jimmy D. Kurz, Dickinson, TX (US); Timothy J. Kulage, Baton Rouge, LA (US)

(73) Assignee: MEMC Electronic Materials, Inc., St. Peters, MO (US)

( * ) Notice: Subject to any disclaimer, the term of this patent is extended or adjusted under 35 U.S.C. 154(b) by 14 days.

(21) Appl. No.: 10/035,456

(22) Filed: Oct. 23, 2001

(65) Prior Publication Data

US 2003/0077128 A1 Apr. 24, 2003

(51) Int. Cl.[7] .................................................. E03D 5/09
(52) U.S. Cl. ......................... 414/291; 209/147; 141/65; 141/286; 406/142; 406/151; 406/163
(58) Field of Search .................. 414/291; 209/147; 406/142, 143, 151, 163

(56) References Cited

U.S. PATENT DOCUMENTS

| | | | |
|---|---|---|---|
| 2,762,658 A | * | 9/1956 | Shirk ........................... 406/14 |
| 3,093,420 A | * | 6/1963 | Levene et al. ............... 406/125 |
| 3,780,446 A | * | 12/1973 | Frimberger ................... 34/581 |
| 4,058,227 A | | 11/1977 | Shakshober et al. |
| 4,082,004 A | | 4/1978 | Weber et al. |
| 4,089,563 A | | 5/1978 | Neu |
| 4,120,203 A | | 10/1978 | Clements et al. |
| 4,165,133 A | | 8/1979 | Johnson |
| 4,200,412 A | | 4/1980 | Steele |
| 4,252,478 A | | 2/1981 | Ollé |
| 4,280,419 A | | 7/1981 | Fischer |
| 4,284,032 A | | 8/1981 | Moos et al. |
| 4,312,388 A | * | 1/1982 | Hager et al. .................... 141/1 |
| 4,449,863 A | | 5/1984 | Ullner |
| 4,552,573 A | | 11/1985 | Weis et al. |
| 4,568,453 A | | 2/1986 | Lowe, Jr. |
| 4,599,016 A | | 7/1986 | Medemblik |
| 4,599,017 A | | 7/1986 | Rüssemeyer et al. |
| 4,640,205 A | | 2/1987 | Brännström |
| 4,648,432 A | * | 3/1987 | Mechalas ...................... 141/68 |
| 4,659,262 A | | 4/1987 | van Aalst |
| 4,812,086 A | | 3/1989 | Kopernicky |
| 4,818,117 A | | 4/1989 | Krambrock |
| 4,826,361 A | | 5/1989 | Merz |
| 4,834,586 A | | 5/1989 | Depew |
| 4,872,493 A | * | 10/1989 | Everman ...................... 141/59 |
| 4,893,966 A | | 1/1990 | Roehl |
| 4,976,288 A | | 12/1990 | Steele et al. |
| 5,184,730 A | * | 2/1993 | Paul ........................... 209/142 |
| 5,252,008 A | | 10/1993 | May, III et al. |
| 5,350,257 A | | 9/1994 | Newbolt et al. |
| 5,584,612 A | | 12/1996 | Nolan |
| 5,746,258 A | * | 5/1998 | Huck ........................... 141/67 |
| 5,967,704 A | | 10/1999 | Ciprian |

* cited by examiner

Primary Examiner—Joseph A. Dillon
(74) Attorney, Agent, or Firm—Senniger, Powers, Leavitt & Roedel (57) ABSTRACT

A granular semiconductor material transport system capable of continuous, non-contaminating transfer of granular semiconductor material from a large source vessel to a smaller and more manageable target vessel. Movement of the granular material is induced by flowing transfer fluid. The system includes a source vessel, a feed tube, a process vessel, a target vessel and a vacuum source, or mover. The source vessel contains a bulk supply of granular material to be transported. A feed tube received within the source vessel transfers the granular material entrained in a transfer fluid from the source vessel to the process vessel. The process vessel separates the granular material from any dust particles and deposits the granular material in the more manageable target vessel. The vacuum source sealably connects to the process vessel to evacuate the process vessel to set the granular polysilicon in motion within the system.

34 Claims, 4 Drawing Sheets

GRANULAR SEMICONDUCTOR MATERIAL TRANSPORT SYSTEM AND PROCESS

BACKGROUND OF THE INVENTION

This invention generally relates to material transport systems and more particularly to a granular semiconductor material transport system capable of continuous, non-contaminating transfer of granular semiconductor material from a large source vessel to a smaller and more manageable target vessel by flowing transfer fluid, without complicated transfer apparatus.

The invention is especially concerned with a material transport system capable of efficiently moving large quantities of granular semiconductor material, such as polysilicon, while reducing contamination of the granular material as it passes through the system. Systems for moving particulate matter are well known in the art. Conventionally, particulate matter transfer systems transfer particulate matter, such as grain, or synthetic particulate matter used for injection molding. These systems often use a moving fluid, such as air, to transfer particulate matter through the system. These systems are not ideal for all applications, however, because the conduits are typically formed from materials different from the particulate matter flowing through the conduit. Over time, these conduits wear, adding unwanted contaminants to the particulate matter. Such contamination is acceptable for some applications, but not with granular semiconductor material.

For granular semiconductor material, no appropriate transport system exists and other challenges remain unaddressed. Before processing, granular semiconductor material is typically stored in large, shipping vessels, or source vessels. Such vessels are cumbersome to empty and typically must be lifted and inverted, allowing the granular material to flow from the vessel by gravity. Constructing an apparatus large enough to lift and invert such a vessel is difficult. Moreover, this difficult operation presents safety, ergonomic and facility space concerns. In addition, because the size and shape of such source vessels vary widely, constructing a lifting and inverting machine that will work with all vessels is difficult. As such, a better method for removing the granular polysilicon from the source vessel is needed, where the source vessel need not be lifted or inverted to remove the contents and the size and shape of the source vessel is immaterial.

SUMMARY OF THE INVENTION

Among the several objects and features of the present invention may be noted the provision of a granular semiconductor material transport system which decreases the potential for contaminating the granular polysilicon during transfer; the provision of such a system which contains the material within the system without allowing material to exit the system or for foreign matter to contaminate the material; the provision of such a system which removes dust from the granular material; the provision of such a system which controls material flow with sufficient precision to transfer precise amounts of material; the provision of such a system which is safe to operate; and the provision of such a system which can move a large amount of material cost effectively and efficiently.

Generally, a granular semiconductor material transport system of the present invention for transporting granular polysilicon comprises a feed tube having one end in fluid communication with a granular polysilicon supply. The feed tube transfers a transfer fluid to the supply and transfers granular material entrained in the transfer fluid from the supply. One end of the feed tube further comprises an outer tube and an inner tube. The outer and inner tubes are arranged to form an annular cavity between the inner and outer tubes. The annular cavity defines a passage for transferring the transfer fluid from a fluid supply to the granular polysilicon supply. The interior of the inner tube transfers the transfer fluid entrained with granular material from the granular polysilicon supply. A process vessel sealably receives an opposite end of the inner tube for receiving transfer fluid entrained with granular material into the process vessel. A vacuum source sealably connects to the process vessel to evacuate the process vessel and remove dust-entrained transfer fluid from the process vessel.

In another aspect of the present invention, a granular material transport system comprises a supply of transfer fluid and a mover in fluid communication with the supply of transfer fluid for drawing the transfer fluid from the supply and creating a flow of said transfer fluid. The system further comprises a process vessel in fluid communication with a granular material supply for receiving the transfer fluid flow entrained with granular material and processing the fluid to separate the granular material from the transfer fluid and any dust. A transfer fluid processing apparatus in fluid communication with the process vessel removes any residual granular material and dust from the transfer fluid. The apparatus is in fluid communication with the mover for returning the treated transfer fluid to the system.

In yet another aspect of the present invention, a process is disclosed for transporting granular semiconductor material in a contaminant-free environment. The process comprises steps of bringing a bulk supply of granular polysilicon at a first location into fluid communication with a location of lower pressure to induce movement of the granular polysilicon toward the location of lower pressure. The process further comprises dedusting the granular polysilicon as it moves toward the location of lower pressure and delivering the dedusted granular polysilicon to a second location.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
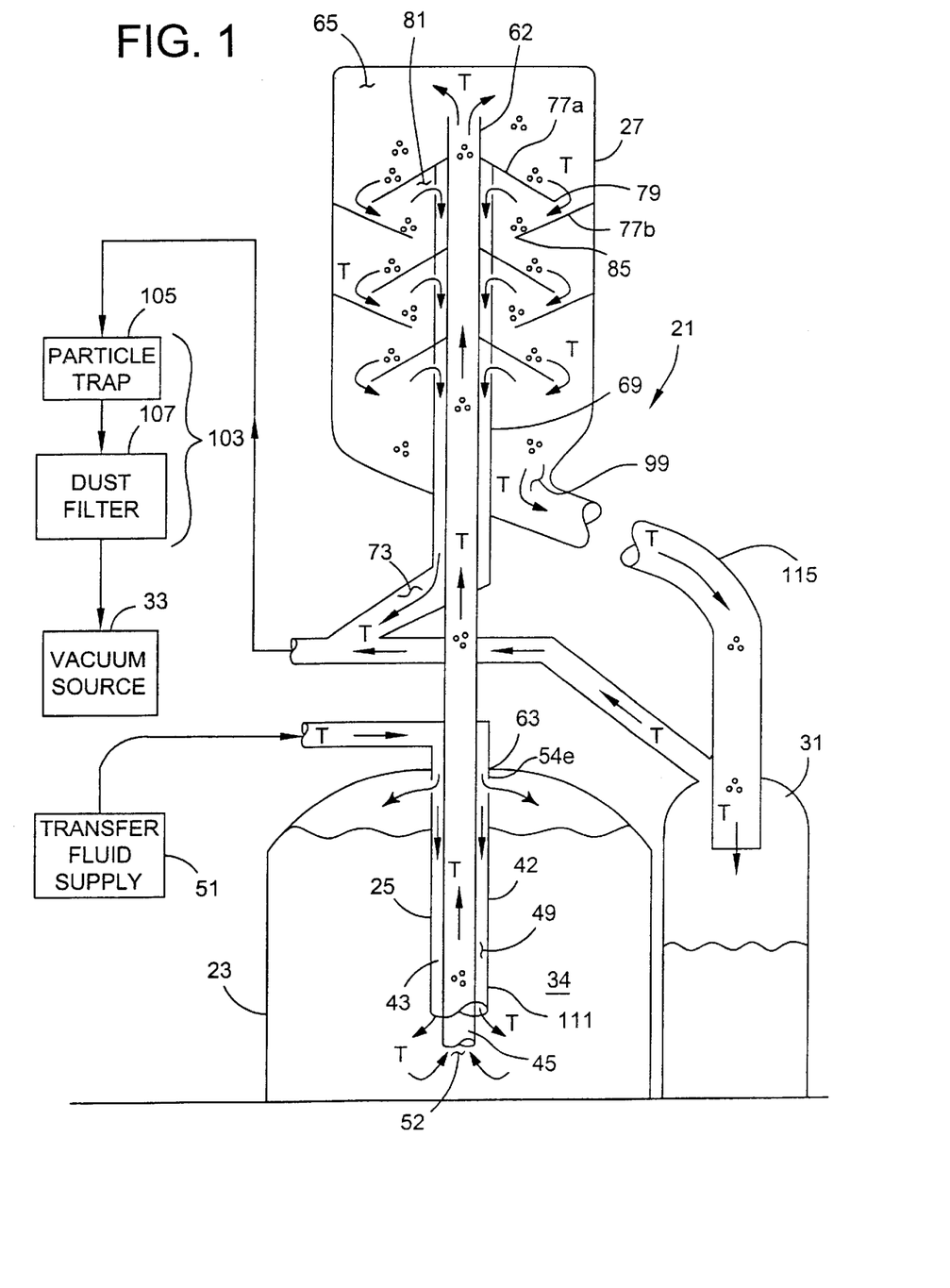
FIG. 1 is a schematic of the granular semiconductor material transport system of the present invention.

Referring now to the drawings and particularly to FIG. 1, reference number 21 generally indicates a granular semiconductor material transport system of the present invention. Generally, the system 21 includes a source vessel 23, a feed tube 25, a process vessel 27, a target vessel 31 and a vacuum source 33, or mover. Each of these will be discussed in greater detail below. When transporting granular polysilicon, maintaining the purity of the conveyed material is of prime importance. Moreover, removing any residual dust within the granular polysilicon is also important. Various techniques for maintaining the purity of the granular polysilicon are discussed throughout, including blanketing the polysilicon with a high purity gas or coating components that contact the polysilicon with non-contaminating materials.

To avoid contamination of the granular polysilicon handled by the system 21, all system components in contact with granular polysilicon at a high velocity, such as the feed tube 25, are formed or coated with materials selected to maintain the non-contaminating performance of the system. Such materials include, but are not limited to, quartz coatings, silicon coatings, solid silicon and solid silicon carbide. Typically, the coatings are applied to a stainless steel substrate. Other materials suitable for non-contaminating performance are also contemplated as within the scope of the present invention. For low velocity portions of the apparatus, TEFLON® or TEFZEL® coatings (available from E. I. du Pont de Nemours and Company of Wilmington, Del., U.S.A.) provide acceptable non-contaminating performance. Application of such materials and coatings is discussed throughout with respect to specific parts of the system.

The source vessel 23 contains a bulk supply of granular material 34 to be transported by entraining the granular material in the flow of a transfer fluid, denoted by arrows T in FIG. 1. Typically, a source vessel 23 is a drum, such as a cone-topped drum, having a charge of non-contaminating argon within the vessel to maintain the purity of the bulk supply of granular polysilicon 34. Under current practice, such source vessels 23 are inverted, allowing the granular polysilicon 34 inside to flow from the source vessel to the target vessel 31. Inverting large source vessels 23 requires complex, cumbersome apparatus for lifting the large weight of the vessel and rotating it to a position where material can flow from the vessel. Such a lifting process raises multiple safety, ergonomic and facility space concerns. To avoid these problems, the present invention places the source vessel 23 in fluid communication, via other components discussed below, with the mover 33, or vacuum source, for receiving transfer fluid T. This system 21 eliminates the problems associated with lifting and inverting granular polysilicon source vessels 23.

Figure 2:
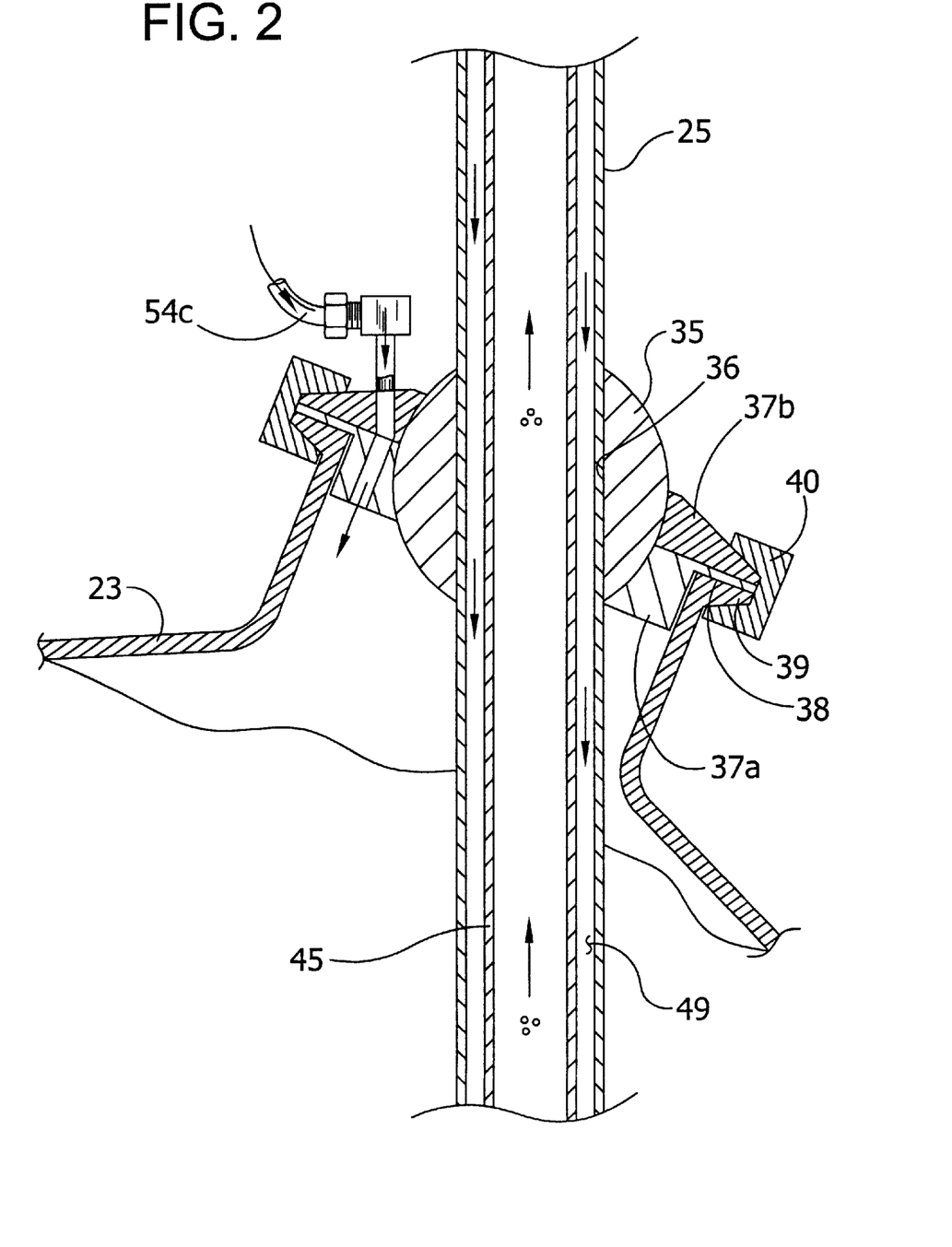
FIG. 2 is a partial, enlarged front section of a feed tube and source vessel of the system of FIG. 1.

Referring now to FIGS. 1 and 2, the feed tube 25 has one end sealably connected to and received within the source vessel 23 for transferring the transfer fluid T to the source vessel, and ultimately moving granular material 34 entrained in the transfer fluid from the source vessel. The orientation and position of the feed tube 25 and source vessel 23 may change depending upon the size and shape of the source vessel. Therefore, the connection between the source vessel 23 and the feed tube 25 requires two degrees of freedom, as may be achieved with an elastomeric ball seal 35. An elastomeric ball seal 35 having a cylindrical opening 36 receives the feed tube 25 and allows for axial and angular adjustment of the feed tube 25 with respect to the source vessel 23. The ball seal 35 is preferably formed from a hard rubber material capable of maintaining the position of the feed tube 25 and forming a seal between the ball seal and the feed tube. A ball seat 37, comprising a lower seat 37a and an upper seat 37b, receives the ball seal 35 and allows the ball seal to rotate to any orientation while held within the seat. The lower seat 37a includes an annular cutout 38 that engages a flanged opening 39 of the source vessel 23. The interaction of the cutout 38 and flanged opening 39 centers the seat 37 and ball seal 35 over the flanged opening of the source vessel 23. An annular clamp 40 engages the flanged opening 39, the lower seat 37a and the upper seat 37b, compressing the three elements together to hold the ball seal 35 in a self-retaining orientation. The wedge shape of the upper seat 37b and flange facilitate forming the seal. The clamp 40 is of conventional design, having multiple hinged portions and a fastener for bringing the hinged portions together to form a circular clamp. Such clamps are available, for example, from Tri-Clover of Kenosha, Wis., U.S.A.

In use, the feed tube 25 and source vessel 23 are placed in the proper orientation and position without the clamp 40 in place. After achieving the desired orientation and position, the clamp 40 may be tightened to hold the feed tube 25 and source vessel 23 in a self-retained position. The upper seat 37b, clamp 40 and source vessel 23 are preferably formed from a stiff material, such as stainless steel, to transmit the clamping force of the clamp to the lower seat 37a and ball seal 35. The lower seat 37a is preferably formed from TEFLON®. Once the clamp 40 is in place, the interaction of the lower seat 37a and ball seal 35 create an air tight seal.

One end of the feed tube, hereinafter the feeding end 42, further comprises an outer tube 43 and an inner tube 45 (FIGS. 1 and 2). The outer and inner tubes 43,45 are arranged to form an annular cavity 49 between the inner and outer tubes. The annular cavity 49 is in fluid communication with a transfer fluid supply 51. Preferred transfer fluids T are inert, or otherwise highly pure, gases, such as Argon or Nitrogen, because they are non-corrosive and non-contaminating. The annular cavity 49 acts as a passage for transferring the transfer fluid T from the transfer fluid supply 51 to the source vessel 23. Transfer fluid T passes through the annular cavity 49 because it is in fluid communication with a positive supply of pressure, such as an outlet (not shown) of the vacuum source 33, as discussed in greater detail below. In other words, positive pressure exhaust gas from the vacuum source 33 passes through the annular cavity 49 to push the granular material. A pressurized transfer fluid supply 51 in fluid communication with the annular cavity 49 may also be used, without the aid of exhaust gases from the vacuum source 33, as shown in FIG. 1.

Once the transfer fluid T passes into the source vessel 23 it begins to flow back toward the low pressure side of the vacuum source 33, which is only accessible via fluid communication through an open end 52 of the inner tube 45. The inner tube extends beyond the end of the outer tube 43, ensuring that the transfer fluid T engages and entrains a measure of granular polysilicon 34 before passing into the inner tube. The interior of the inner tube 45 then transfers the transfer fluid T entrained with granular material away from the source vessel 23. The velocity of the transfer fluid T in the feed tube 25 must be greater than the terminal velocity of the largest granular polysilicon 34 particles, so that the particles will remain entrained within the flow of transfer fluid.

In the preferred embodiment, the inner tube 45 is straight. By eliminating bends in the inner tube 45 the polysilicon passes through easily, without excessively abrading the interior of the inner tube. This is particularly important inside the inner tube 45 where the granular polysilicon 34 entrained within the transfer fluid T moves at high speed. Eliminating corners and bends reduces the frictional forces of the moving polysilicon 34 on the inner tube 45. This feature further reduces the possibility of contaminating the granular polysilicon 34, because polysilicon moving parallel to the walls of the transfer conduit (e.g., the inner tube 45) causes less conduit wear. Also in the preferred embodiment, the feed tube 25 is disposed in a substantially vertical orientation. This allows an upper opening 63 of the source vessel 23 to readily receive the feed tube 25. In addition, because the inner tube 45 is substantially vertical, the pressure of the granular polysilicon 34 passing through the tube distributes more evenly about the perimeter of the inner tube. Granular polysilicon moving through a more horizontally oriented conduit, for instance, would wear the downward facing wall more quickly.

The outer tube 43 is preferably a stainless steel substrate coated with a layer of polysilicon, TEFZEL® or TEFLON®. Alternately, the outer tube 43 may be comprised entirely of polysilicon or silicon carbide. Each of these is sufficiently hard and smooth to ease insertion of the feed tube 25 into the granular material supply 34. In addition, for a polysilicon tube or a polysilicon coated tube, any particulate matter formed by wear of the outer tube 43 engaging the granular material supply 34 is itself highly pure polysilicon. Such particulate matter is non-contaminating, because it is identical to the granular polysilicon 34 within the source vessel 23. Alternately, a TEFZEL® or TEFLON® coated outer tube 43 is useful because it resists wear and helps protect the inner lining of the source vessel 23 from damage due to inadvertent contact between the tube and vessel. The inner tube 45 is preferably formed from quartz, polysilicon or silicon carbide, each of which is hard enough to resist abrasions, even at the higher particle velocities found within the inner tube.

Figure 3:
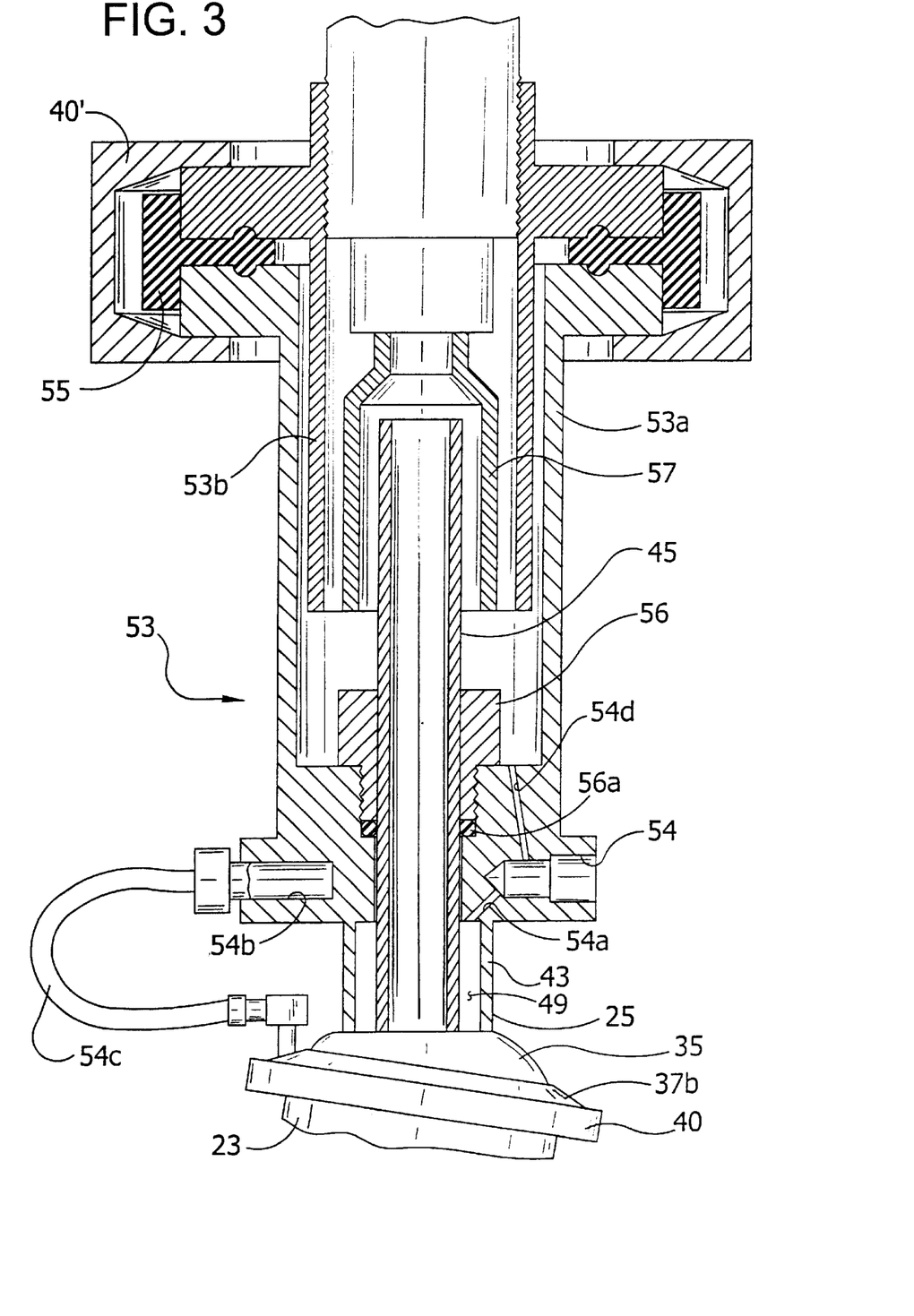
FIG. 3 is a partial, enlarged front section of a feed tube connector of the system of FIG. 1.

Turning now to FIG. 3, a connector for connecting the feed tube 25 with the process vessel 27 is generally indicated by 53. The connector eases connection of the feed tube 25 with the process vessel 27 by providing a partially adjustable and easily detachable and attachable connection. The connector 53 includes a lower portion 53*a* attached to the outer tube 43. As depicted in FIG. 3, the lower portion 53*a* and outer tube 43 are of one-piece construction, although they may readily be formed from more than one-piece. The lower portion 53*a* is generally cylindrical in shape and includes an inlet 54 for receiving transfer fluid T from the transfer fluid supply 51. The inlet 54 includes multiple paths for transfer fluid T to flow throughout the system 21. The transfer fluid T passes through a cavity supply channel 54*a* and into the cavity 49 for transport to the source vessel as described above. The transfer fluid T additionally passes from the lower portion 53*a* via a bypass channel 54*b* and bypass hose 54*c*. Such fluid then flows into the source vessel 23 above the bulk supply of granular material 34 (FIGS. 2 and 3). This additional flow of transfer fluid T acting upon the upper surface of the granular material 34 further enhances the movement of granular material through the system 21. The transfer fluid T passing through the bypass hose 54*c* is particularly effective when the upper surface of the bulk supply of granular material 34 in the source vessel 23 is at about the same level as the open end 52 of the feed tube 25. In an alternate embodiment, the bypass channel 54*b* and bypass hose 54*c* may be replaced by placing openings 54*e* in the outer tube 43, as shown in FIG. 1. Such openings 54*e* provide a similar function of the bypass channel 54*b* and hose 54*c*. The third path the transfer fluid T may take as it passes through the connector 53 is through a upwardly directed support channel 54*d*. The transfer fluid T passing through the support channel 54*d* supports the flow of granular material 34 as it passes through the connector 53, as will be discussed in greater detail below.

The connector 53 further comprises an upper portion 53*b* attached to the process vessel 27. The upper portion is generally cylindrical in shape and is received within the lower portion 53*a*. An annular seal 55 between the upper portion 53*b* and lower portion 53*a* forms an air tight seal between the two. A clamp 40', similar to the clamp disclosed above, holds the upper portion 53*b*, lower portion 53*a* and annular seal 55 together. The annular seal 55 is preferably formed from an elastomeric material, such as rubber.

The inner tube 45 extends upward within the lower portion 53*a*. A compression nut 56 threads onto the lower portion 53*a*, capturing an O-ring 56*a* between the compression nut, lower portion and inner tube 45. The O-ring 56*a* forms a seal between the inner tube 45 and the connector 53. The O-ring 56*a* is preferably formed from a soft material that will not damage the inner tube 45 when the compression nut 56 is tightened into position. The inner tube 45 splits into two pieces within the connector, including a cylindrical inlet 57, which engages the upper portion 53*b*, for receiving granular material 34 from the inner tube 45. The vacuum created within the process vessel 27 facilitates movement of the granular material 34 from the source vessel 23 to the process vessel. As the material 34 passes through the connector 53, the pressure differential between the process vessel 27 and the source vessel 23 continues to lift the granular material. Moreover, the substantial overlap of the inner tube 45 and the cylindrical inlet 57 helps guide the granular material as it passes through the connector. The spacing between the inner tube 45 and the cylindrical inlet 57 should be at least two and a half (2.5) times the maximum particle size, so that the components do not lock or seize with respect to one another due to particle interaction. Such spacing is required throughout the system, wherever there is relative movement of surfaces with respect to one another. To further ensure that all of the granular material 34 entrained in the transfer fluid T passes through the connector 53, the additional transfer fluid passing through the support channel 54*d* acts to provide additional lifting force upon the moving stream of granular material.

In use, the connector 53 is readily separated into the lower portion 53*a* and upper portion 53*b* by removal of the clamp 40'. Once separated, the upper portion 53*b*, which is rigidly connected to the process vessel 27, may be lifted away from the lower portion 53*a*. The lower portion 53*a* remains connected to the inner tube 45 and extends upward beyond the top end of the inner tube to protect the tube from damage. Once the bypass hose 54*c* and clamp 40 are disconnected from the source vessel 23, the feed tube 25 and connector 53 may be removed from the source vessel and reattached to another source vessel. The connector 53 provides relatively simple connection and disconnection between the source vessel 23 and process vessel 27. Splitting the inner tube 45 into two pieces facilitates bringing the source vessel 23, process vessel 27 and feed tube 25 into position for engagement and use of the system 21. Although the connector 53 is contemplated as part of the system shown in FIG. 1, it is not shown in the FIG. 1 schematic in order to simplify the figure. It should be understood that modifications to the connector 53 are contemplated as within the scope of the present invention. For instance, rather than having an inner tube 45 formed from two portions, the inner tube may be continuous from the source vessel 23 to the process vessel 27, such that the process vessel and the entire feed tube 25 move conjointly with respect to one another. In such an arrangement, seals are required where the inner tube 45 enters each vessel 23,27.

Figure 4:
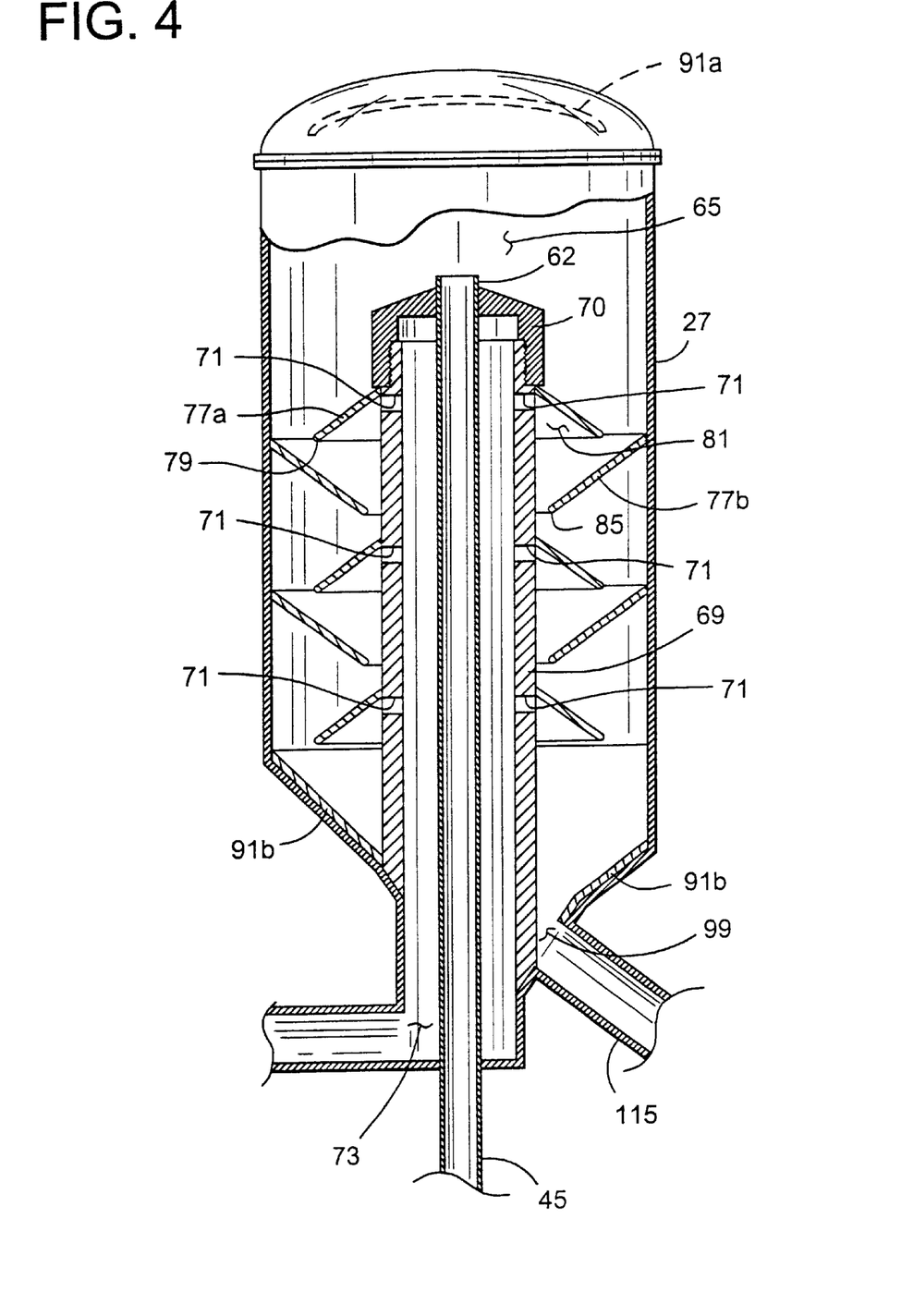
FIG. 4 is a partial front section of a process vessel of the system of FIG. 1.

Referring now particularly to FIGS. 1 and 4, the process vessel 27 is in fluid communication with the source vessel 23 for receiving the transfer fluid T flow entrained with granular material 34 and processing the fluid to separate the granular material from the transfer fluid and dust. The process vessel 27 sealably receives the opposite end of the inner tube 45 for receiving transfer fluid T entrained with granular material 34 into the process vessel. After passing through the inner tube 45 of the feed tube 25 and exiting an upper end 62 of the feed tube in the process vessel 27, the granular polysilicon 34 entrained in the transfer fluid T emerges from the inner tube into an upper portion 65 of the process vessel. Here, the velocity of the transfer fluid T and the granular material 34 it holds decreases dramatically, as compared with inside the inner tube 45, allowing each to move more slowly through the process vessel 27, influenced partially by gravity. This allows the granular material 34 to drop out of the transfer fluid T stream, while the dust remains entrained within the transfer fluid.

A vacuum receiver 69 connects to the vacuum source 33 and is disposed within the process vessel 27 for receiving the transfer fluid T. The vacuum receiver 69 sealably connects to the upper end 62 of the inner tube 45 via a threadable cap 70. The cap 70 may be formed from silicon or silicon carbide, for improved wear resistance. The vacuum receiver 69 has holes 71 and an open bottom 73 for allowing transfer fluid T and dust to flow into the vacuum receiver and from the process vessel 27. Both the vacuum receiver 69 and process vessel 27 are cylindrical, such that the cylindrical axis of the process vessel is coincident with the cylindrical axis of the vacuum receiver. Other shapes and arrangements are contemplated as within the scope of the present invention, although the preferred arrangement disclosed above yields uniform transfer fluid T flow about the process vessel 27. Uniform flow encourages decreased transfer fluid T velocity throughout the chamber, because the transfer fluid flow is spread evenly over the largest possible area. This further encourages entrained granular polysilicon 34 to drop from the stream of transfer fluid T.

The process vessel 27 further comprises at least one baffle 77 disposed within the process vessel to alter the flow of the granular material 34 to encourage dust entrained in the granular material to separate from the granular material. As the granular material 34 tumbles and slides over the baffle 77, dust particles on the surface of the granular material may loosen and separate from the particle and become entrained in the transfer fluid T. Such a baffle 77, or baffles, may take many forms, although an outwardly facing first baffle 77a disposed adjacent the vacuum receiver 69 is contemplated as one preferable configuration. Such an outwardly facing first baffle 77a concentrically mounts on the vacuum receiver 69. The first baffle 77a extends outwardly and downwardly from the vacuum receiver 69 in a frustoconical shape, ending in a lower terminal edge 79 spaced from the interior of the process vessel 27. Interaction of the first baffle 77a and the vacuum receiver 69 creates an annular pocket 81 underneath the baffle. As the granular polysilicon 34 passes through the process vessel 27, it passes over the first baffle 77a and does not flow into the annular pocket 81 because gravity pulls downwardly upon the polysilicon, impeding its ability to move with the transfer fluid T toward holes 71. The holes in the vacuum receiver 69 lie beneath the first baffle 77a, near the annular pocket, where the first baffle extends from the vacuum receiver, so that granular polysilicon 34 does not flow into the holes. These holes 71 act as flow passages for transfer fluid T passing from the process vessel 27 and into the vacuum receiver 69, as discussed in greater detail below. The number and size of holes 71 may vary, depending upon the desired system flowrate. Typically, four holes 71 are arranged beneath each baffle, spaced at regular intervals about the vacuum receiver 69.

Although the present invention will operate effectively with only the first baffle 77a, an additional second baffle 77b extending inwardly and downwardly from the periphery of the process vessel 27 in a frustoconical shape will aid in processing the transfer fluid T containing granular polysilicon 34. The second baffle 77b ends in a terminal lower edge 85 spaced from the vacuum receiver 69. With one first baffle 77a and one second baffle 7ba, the granular polysilicon 34 changes direction twice, further aiding separation of the polysilicon from the transfer fluid T. Multiple first and second baffles may be added, as shown in FIGS. 1 and 4. The first and second baffles 77a, 77b alternate with one another, forming a sinusoidal path for the granular silicon 34 to follow through the process vessel 27. As the granular material 34 passes through the process vessel 27, dust captured within the transfer fluid T is separated from the granular material and evacuated from the process vessel by the transfer fluid.

To protect the interior of the process vessel 27 from the cumulative effects of the moving granular material 34, which could cause mechanical wear and potential contamination, at least one insert 91 mounts on the interior of the process vessel. The insert 91 is formed from polysilicon and acts to protect the interior of the process vessel 27 from abrasion due to moving granular material. Inserts 91 may be positioned in any location within the process vessel where wear is likely to occur. These locations depend upon the shape and orientation of the vessel. Preferably, an inlet insert 91a mounts opposite the upper end 62 of the inner tube 45 to protect the process vessel 27 from wear. The inlet insert 91a mounts above the upper end 62 of the inner tube 45 for protecting the portion of the process vessel 27 subject to impact by granular polysilicon 34 exiting the inner tube at a high rate of speed. Over time, this continuous flow of polysilicon 34 will wear away whatever surface continually receives the impact of the polysilicon. The inlet insert 91a will similarly wear, but because it is formed from polysilicon, any particles generated by such wear will be non-contaminating, because they are formed from polysilicon. Moreover, the inlet insert 91a is replaceable once it becomes worn through and can no longer protect the interior of the process vessel 27. Another wear minimization technique involves increasing the distance between the upper end 62 of the inner tube 45 and the top of the process vessel 27. As this distance increases, the speed with which the granular polysilicon 34 strikes the top of the process vessel 27 decreases, reducing wear. Such a technique is useful, subject to the size limitations of the process vessel 27.

For reasons similar to those-relating to the inlet insert 91a disclosed above, an outlet insert 91b mounts adjacent the bottom of the process vessel 27 to protect the bottom portion of the process vessel from wearing as the polysilicon 34 passes from the process vessel. All of the granular material 34 exiting the process vessel 27 passes this single location, increasing the incidence of wear. The vertical walls of the process vessel 27 and the vacuum receiver 69 may also be coated with silicon for increased wear resistance, but do not generally require inserts. Preferably, such vertical walls may be coated with a less expensive TEFLON® coating, as described above, or a TEFZEL® coating. These surfaces do not typically require the best wear protection available because they wear more slowly than the portions of the process vessel requiring inserts 91.

After passing through the process vessel 27, gravity allows the granular material within the process vessel to flow into the target vessel 31, which is typically configured for use in a crystal pulling process. The target vessel 31 is the final destination for the granular polysilicon 34 passing through the system 21. An orifice 99 near the bottom of the process vessel 27 allows the granular polysilicon 34 to exit the process vessel. The target vessel 31 sealably receives the orifice 99 of the process vessel for receiving granular material 34 from the process vessel 27.

The entire process set forth above is set in motion due to the mover 33, or vacuum source, sealably connected to the process vessel 27, which evacuates the process vessel and removes dust-entrained transfer fluid T from the process vessel. In addition, the transfer fluid supply 51 is pressurized for creating a larger pressure differential across the system, effectively "pushing" the granular material 34 and transfer fluid T through the system. The vacuum source 33 exhaust, or positive pressure side, may further connect to the supply of transfer fluid 51 (not shown), adding to the transfer fluid flowing through the system 21. Placing the exhaust side of the mover 33 in fluid communication with the supply of transfer fluid 51 helps draw the transfer fluid T from the supply for creating a flow of transfer fluid within the system 21. The vacuum source 33 further sealably connects to the target vessel 31 to remove any additional dust-entrained transfer fluid T. Connecting the vacuum source 33 to the target vessel 31 additionally encourages the granular polysilicon 34 to flow from the process vessel 27 to the target vessel more quickly than by gravity alone.

The system 21 may operate as described above, continuously introducing virgin transfer fluid T into the system and venting dust entrained transfer fluid used by the system. Alternately, a transfer fluid processing apparatus 103 may be placed in fluid communication with the process vessel 27 and mover 33 for removing any residual granular material and dust from the used transfer fluid T. The apparatus 103 is in fluid communication with the mover 33 for returning the treated transfer fluid to the system 21. Specifically, the transfer fluid processing apparatus 103 comprises a particle trap 105 for removing particles entrained in the fluid T and a dust filter 107 for removing dust from the transfer fluid. The vacuum source 33 may also be integrated with the transfer fluid processing apparatus 103, such as with a conventional vacuum apparatus. Once the fluid T passes through the transfer fluid processing apparatus 103, the transfer fluid mixes with any additional virgin transfer fluid from the transfer fluid supply 51 and circulates through the system 21. The addition of a particle trap 105 and dust filter 107 recycles the used transfer fluid T such that the system uses less virgin transfer fluid from the transfer fluid supply 51. Once the system 21 is recycling transfer fluid T, additional virgin transfer fluid need only be added to account for system losses, such as leaks. Such a closed system is also advantageous due to its increased portability when packaged as a ready to use system, requiring minimal connections.

In operation, the source vessel 23 may be placed on a tilt mechanism (not shown) at floor level. The source vessel 23 receives the feed tube 25 so that a lower end 111 of the feed tube is submerged in the granular polysilicon 34. The lower end 111 of the feed tube 25 must be robust enough to resist breakage if the tube contacts the source vessel 23 during insertion or system operation. The source vessel 23 may tilt slightly on the tilt mechanism to ease placement of the feed tube 25 in a bottommost corner of the source vessel, thereby allowing the feed tube to empty the source vessel fully. As the transfer fluid T flows down the annular cavity 49 and into the source vessel 23, it picks up granular polysilicon 34 within the source vessel and carries it up the inner tube 45 toward the process vessel 27. Once inside the process vessel 27, the granular polysilicon 34 flows down through the baffles 77 under the influence of gravity and the vacuum created within the target vessel 31. As the granular polysilicon 34 moves through the process vessel 27, dust-entrained transfer fluid T flows from the process vessel through the holes 71 underneath the baffles 77. The polysilicon 34 then exits the process vessel 27 and falls within the target vessel 31. Here, any remaining transfer fluid T flows toward the vacuum source 33 for venting or recycling by the transfer fluid processing apparatus 103, as described above.

It is also envisioned that the present invention comprises multiple output tubes 115 extending from the orifice 99 of the process vessel 27. One such output tube 115 is depicted in FIGS. 1 and 4. Incorporating multiple such tubes 115 (not shown) would allow continuous transfer of granular polysilicon 34 into multiple target vessels 31 either simultaneously or sequentially. For example, a dual pipe output tube with a directional valve would allow for filling a first target vessel and then a second target vessel by altering the flow of the directional valve. While the second target vessel is filling, a third target vessel may attach to the first outlet tube where the first target vessel attached, in anticipation of altering the valve to its previous position. The same concept is applicable to the feed tube 25 entering the source vessel 23, allowing for continuous processing of granular polysilicon 34 from multiple source vessels.

Many components of the present invention are depicted as being of unitary construction, but it is contemplated that those parts could be formed from multiple individual pieces without departing from the scope of the present invention. Other adaptations are also contemplated as within the scope of the present invention. For instance, the inner tube 45 need not be coaxial with the vacuum receiver 69. The inner tube 45 may pass through the process vessel at some distance from the vacuum receiver of the vessel. Other arrangements are also contemplated as within the scope of the present invention.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A granular semiconductor material transport system for transporting granular polysilicon comprising:
   a feed tube having one end in fluid communication with a granular polysilicon supply, said feed tube directing a transfer fluid to the supply and receiving granular material entrained in the transfer fluid from the supply, said one end of the feed tube further comprising an outer tube and an inner tube, said outer and inner tubes being arranged to form an annular cavity between the inner and outer tubes, said annular cavity defining a passage for directing the transfer fluid from a fluid supply to the granular polysilicon supply, while the interior of the inner tube receives the transfer fluid entrained with granular material from the granular polysilicon supply;

a process vessel sealably receiving an opposite end of the inner tube for receiving transfer fluid entrained with granular material into the process vessel; and a vacuum source sealably connected to the process vessel to said vacuum source drawing dust-entrained transfer fluid from the process vessel.

2. A transport system as set forth in claim 1 wherein the process vessel further comprises at least one baffle disposed within the process vessel to alter the flow of the granular material to encourage dust entrained in the granular material to separate from the granular material.

3. A transport system as set forth in claim 2 wherein said inner tube is substantially straight.

4. A transport system as set forth in claim 3 wherein said feed tube is disposed in a substantially vertical orientation.

5. A transport system as set forth in claim 3 wherein said outer tube is coated with a layer of polysilicon.

6. A transport system as set forth in claim 3 wherein said outer tube is coated with a layer of at least one of TEFZEL® or TEFLON®.

7. A transport system as set forth in claim 3 wherein said inner tube is formed silicon or silicon-carbide.

8. A transport system as set forth in claim 2 further comprising a vacuum receiver connected to the vacuum source and disposed within the process vessel, said vacuum receiver having holes and an open bottom for allowing transfer fluid and dust to flow into the vacuum receiver from the process vessel.

9. A transport system as set forth in claim 8 wherein said process vessel and said vacuum receiver are each cylindrical, such that the cylindrical axis of the process vessel is coincident with the cylindrical axis of the vacuum receiver.

10. A transport system as set forth in claim 8 wherein said at least one baffle is disposed adjacent said vacuum receiver.

11. A transport system as set forth in claim 10 wherein said at least one baffle is concentrically mounted on said vacuum receiver.

12. A transport system as set forth in claim 10 wherein said at least one baffle constitutes a first baffle extending outwardly and downwardly from the vacuum receiver in a frustoconical shape, said first baffle ending in a lower terminal edge spaced from the process vessel.

13. A transport system as set forth in claim 12 wherein said holes in said vacuum receiver are located beneath said first baffle, near where the first baffle extends from the vacuum receiver.

14. A transport system as set forth in claim 13 further comprising at least one second baffle extending inwardly and downwardly from the periphery of the process vessel in a frustoconical shape, said at least one second baffle ending in a terminal lower edge spaced from the vacuum receiver.

15. A transport system as set forth in claim 14 wherein said first and second baffles alternate with one another, thereby forming a sinusoidal path for the granular silicon to follow through the process vessel, such that as the granular material passes through the vessel, dust captured with the granular material is separated from the granular material and evacuated from the process vessel by the transfer fluid.

16. A transport system as set forth in claim 1 wherein said process vessel further comprises an orifice for allowing granular polysilicon to exit the process vessel.

17. A transport system as set forth in claim 16 further comprising a target vessel, said target vessel sealably receiving said orifice for receiving granular material from the process vessel.

18. A transport system as set forth in claim 17 wherein said vacuum source sealably connects to the target vessel to remove any additional dust-entrained transfer fluid.

19. A transport system as set forth in claim 1 further comprising at least one insert mounted on the interior of said process vessel, said insert acting to protect the interior of the process vessel from abrasion due to moving granular material.

20. A transport system as set forth in claim 19 wherein said insert is formed from silicon, silicon-carbide or TEFZEL®.

21. A transport system as set forth in claim 20 wherein said insert mounts opposite an outlet of said inner tube to protect the process vessel from wear.

22. A transport system as set forth in claim 20 wherein said insert mounts adjacent the bottom of the process vessel to protect the process vessel from wear.

23. A transport system as set forth in claim 1 wherein said feed tube further comprises a connector for connecting and disconnecting the inner tube with the process vessel.

24. A transport system as set forth in claim 23 wherein said feed tube is separated into two portions, including a cylindrical inlet portion which is axially larger than the feed tube for receiving an end of the feed tube.

25. A transport system as set forth in claim 23 wherein said connector further comprises a separable upper portion and lower portion.

26. A transport system as set forth in claim 25 wherein said inner tube is fully received within said lower portion for protection of the inner tube.

27. A transport system as set forth in claim 1 in combination with the transfer fluid, and wherein the transfer fluid is an inert gas selected from a group including nitrogen and argon gas.

28. A transport system as set forth in claim 1 further comprising a source vessel containing the supply of granular material to be transported.

29. A transport system as set forth in claim 28 further comprising a ball seal between said feed tube and said source vessel, said source vessel receiving said ball seal and said ball seal receiving said feed tube for axial and angular adjustment of the feed tube with respect to the source vessel.

30. A transport system as set forth in claim 1 wherein said process vessel processes said transfer fluid to separate the granular material from the transfer fluid and any dust, said transport system further comprising a transfer fluid processing apparatus in fluid communication with the process vessel for removing any residual granular material and dust from the transfer fluid, said apparatus being in fluid communication with the vacuum source for returning the transfer fluid to the system.

31. A system as set forth in claim 30 wherein the process vessel further comprises at least one baffle disposed within the process vessel to alter the flow of the granular material to encourage dust entrained in the granular material to separate from the granular material.

32. A system as set forth in claim 30 wherein said transfer fluid processing apparatus further comprises a particle trap for removing particles entrained in the transfer fluid and a dust filter for removing dust from the transfer fluid.

33. A system as set forth in claim 30 wherein said transfer fluid is argon gas.

34. A system as set forth in claim 30 wherein said transfer fluid is nitrogen gas.

* * * * *

UNITED STATES PATENT AND TRADEMARK OFFICE
CERTIFICATE OF CORRECTION

PATENT NO.    : 6,609,870 B2                                              Page 1 of 1
DATED         : August 26, 2003
INVENTOR(S)   : Dick S. Williams et.al.

It is certified that error appears in the above-identified patent and that said Letters Patent is hereby corrected as shown below:

Column 11,
Lines 4 and 5, "vessel to said vacuum" should read -- vessel, said vacuum --.

Signed and Sealed this

Eleventh Day of November, 2003

JAMES E. ROGAN
*Director of the United States Patent and Trademark Office*